United States Patent [19]

Horning

[11] 4,214,194

[45] Jul. 22, 1980

[54] TIMING CIRCUITRY AND METHOD FOR A STEPPING MOTOR

[75] Inventor: Thomas Horning, San Fernando, Calif.

[73] Assignee: Data Products Corporation, Woodland Hills, Calif.

[21] Appl. No.: 856,649

[22] Filed: Dec. 2, 1977

[51] Int. Cl.² ............................................ H02K 37/00
[52] U.S. Cl. .................................. 318/696; 310/49 R
[58] Field of Search .............. 318/696, 685; 310/49 R

[56] References Cited

U.S. PATENT DOCUMENTS

| | | | |
|---|---|---|---|
| 3,385,984 | 5/1968 | O'Regan | 310/49 R |
| 3,423,658 | 1/1969 | Barrus | 318/696 |
| 3,445,741 | 5/1969 | Gerber | 318/696 |
| 3,660,747 | 5/1972 | Kruer et al. | 318/696 |
| 3,736,487 | 5/1973 | Cook et al. | 318/696 |
| 4,093,905 | 6/1978 | Von Braun | 318/696 |

*Primary Examiner*—Gene Z. Rubinson

[57] ABSTRACT

A method for driving stepping motors, typically used in digital hard copy printers, can be employed wherein the phased stator coils of the stepping motor are energized in an overlapping relationship. In addition, the voltage or current applied to the stator coils in a stepping motor may be driven in a pulsed manner such that certain portions of the energized duration are characterized by a higher driving current or voltage. By virtue of the simultaneous activation of the adjacent phases of the stator coils, quasi-equilibrium positions may be created between the equilibrium positions in a stepping motor with the result that a smoother and more uniform angular accelerations and decelerations can be obtained. Circuitry conducive to a digital application to practice the method of the present invention employs a multiple bit shift register driven by a decoder and which in turn drives a plurality of operational amplifiers. Another operational amplifier coupled to the decoder provides a controlled current source. Each set of phased stator coils is then controlled by one of the plurality of operational amplifiers.

11 Claims, 13 Drawing Figures

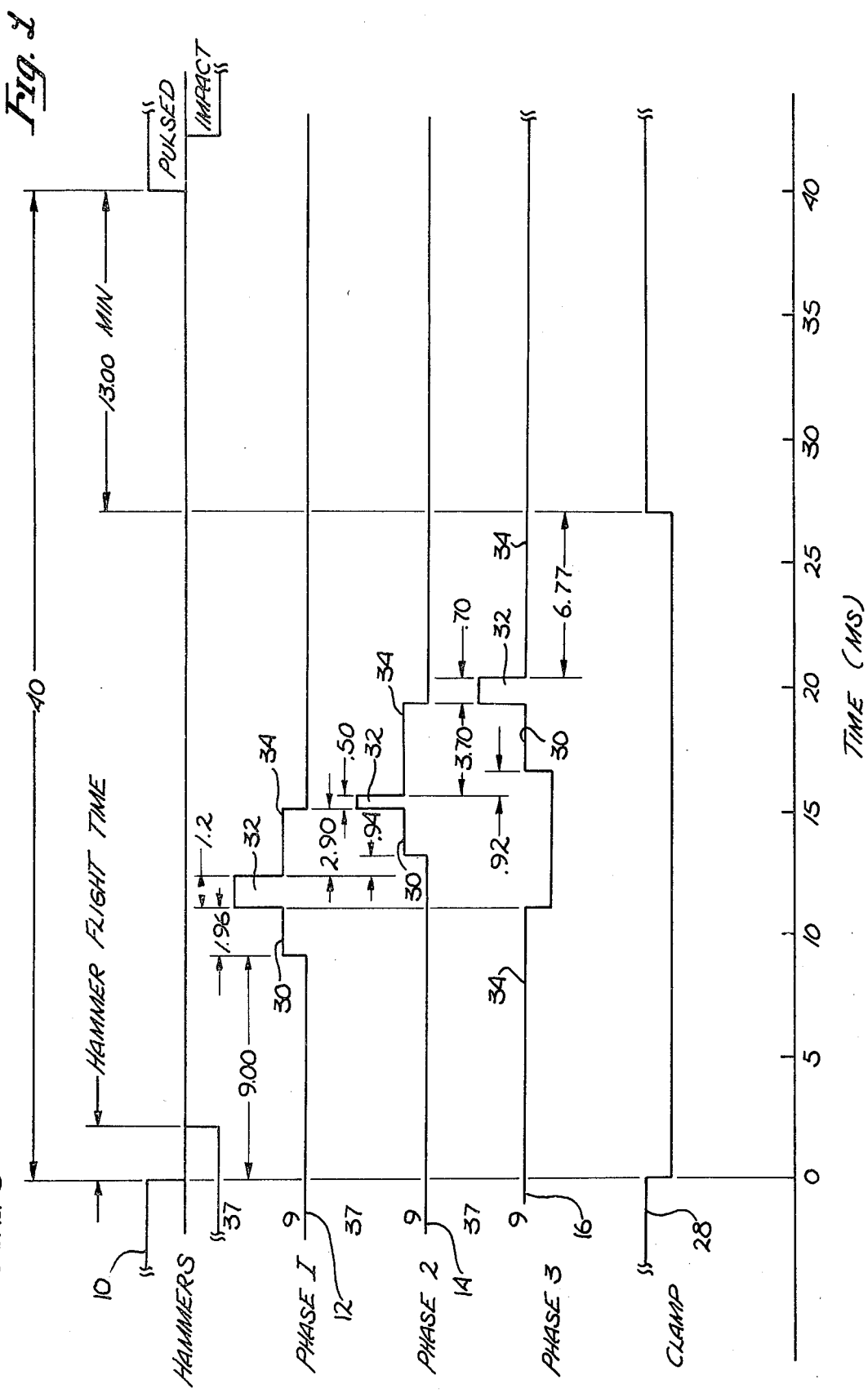

(PHASE 1)

(PHASE 1+2)

(PHASE 2)

(PHASE 2+3)

(PHASE 3)

TIMING CIRCUITRY AND METHOD FOR A STEPPING MOTOR

BACKGROUND OF THE INVENTION

1. Field of the Invention

The present invention relates to a methodology and apparatus for driving a stepping motor and in particular relates to the means and ways in which a stepping motor may be employed in a digital circuit to drive the paper feed on a hard copy printer.

2. Prior Art

Hard copy printers for digital circuitry in computers utilize paper feeds employing various types of stepping motors. The stepping motor is coupled through a conventional mechanical power train which ultimately drives a sprocketed wheel. The sprocketed wheel is coupled to the paper fed through the printer by means of holes provided in the edges of the paper which are engaged by the sprocketed wheel.

When it is desired that the paper be fed through the digital printer, the stepping motor is cycled through a series of steps. Since the amount of paper fed must be accurate and uniform in order to create a reliable printout, some means must be employed to accurately stop the stepping motor at a predetermined position. Typically, prior art stepping motors using phased stator coils or poles employed a methodology and circuitry wherein the plurality of sets of phased stator coils were driven sequentially. The set of phased coils energized would create a discretely rotating configuration around the sets of stator coils which would be followed by the rotor of the stepping motor.

When the predetermined position had been reached, the next to the last set of coils which had been energized would be re-energized in order to create a braking effect upon the rotating rotor. After the momentum of the rotor had been substantially decreased by the reversed biased coils, the reverse biased coils would be appropriately de-energized and the last set of coils re-energized in order to the fix or urge the rotor into the predetermined position.

As a result of the methodology and apparatus used, two additional cycles would have to be added to the normal driving sequence used in the stepping motor, namely, one phase to brake the rotor and a second phase to fix or urge the rotor in the predetermined position. In addition, the position of the rotor would tend to ring about the predetermined end position since the rotor was usually stopped hard in its end position. Finally, the torque supplied by the motor would discretely follow the energization of the separate stator coils with the result that the torques applied by the motor through the sprocket wheels to the paper would tend to be impulsive and jerky. In some cases, the sprockets would substantially deform, tear, or stretch the sprocket holes provided in the edges of the paper with the result that there would be a paper feed failure or a certain degree of misalignment in the printed, hard copy lines. The present invention discloses a methodology and apparatus for overcoming each of these shortcomings of the prior art.

BRIEF SUMMARY OF THE INVENTION

The present invention is an improvement in the method for driving a stepping motor. A stepping motor executes a number of repetitive angular displacements or steps on a motor shaft and is characterized by a plurality of stator poles and rotor poles. The stator poles or coils are grouped into a multiple of phased sets. The rotor and stator poles assume a plurality of equilibrium configurations with respect to their relative position one to the other. The improvement of the present invention comprises the step of simultaneously activating at least two of the multiple sets of stator poles to create a quasi-equilibrium configuration with respect to a relative position of the stator poles and rotor poles. The quasi-equilibrium configuration which is thus created is positionally distinguishable from each of the plurality of equilibrium configurations, and typically a quasi-equilibrium configuration is inserted between each equilibrium configuration. As a result of this improvement, the rotor poles are generally angularly accelerated with respect to the stator poles in a smooth and uniform manner.

The improvement of the present invention may further be comprised of the step of decelerating the angular velocity of the rotor poles by creating at least one quasi-equilibrium configuration wherein that quasi-equilibrium configuration created tends to angularly decelerate the stator poles with respect to the rotor poles by positionally lagging the relative positions of said rotor poles with respect to stator poles at least for a fraction of the duration of said quasi-equilibrium configuration. As a result, the rotor poles are generally, uniformily and smoothly decelerated to a stationary relative configuration with respect to the stator poles.

In one embodiment, at least two of the multiple of sets of stator poles are configured in the stepping motor as adjacent sets of stator poles. In addition, at least one set of stator poles are selectively pulsed with a two level signal. The two level signal has leading and following low level portions and a high level portion between the leading and following low level portions. The following low level portion of the two level signal on one of the two simultaneously activated sets of stator poles coincides at least in part with the leading low level portion of the two level signal on the other one of the two simultaneously activated sets of stator poles. The high level portion of the two level signal on the one of the two simultaneously activated sets of stator poles follows in time the following low level portion of the two level signal on the other one of the simultaneously activated sets of stator poles.

The apparatus of the present invention is used for driving a stepping motor having a plurality stator and rotor poles. The stator and rotor poles are grouped into a plurality of phased sets and assume a plurality of equilibrium configurations with respect to the relative position of the stator poles to the rotor poles. The apparatus comprises a decoder for decoding a digital command signal and for selectively generating therefrom a clock signal, an initialize signal and pulse signal. A means for selectively generating a plurality of timing signals is included. The timing signals are derived from the clock signal and initialize signal. This means is coupled to the decoder. Further, there is a plurality of amplifiers each of which has an input coupled to the means and has an output coupled to one of the plurality of phased sets of stator poles. The amplifiers are each controlled by one of the plurality of timing signals to selectively, simultaneously activate at least two of the plurality of phased sets of stator poles. Finally, a center tap amplifier having an input coupled to the pulse signal from the decoder and an output coupled to a common center tap at the plurality of sets of stator poles is included.

The apparatus also includes a means for generating a solenoid clamping current in response to clamp signal generated by the decoder. The two levels of the two level signal are generated by use of center tap amplifier which has two output levels which are selectively generated in response to the pulse signal.

These and other details of the present invention are more fully set forth in the Detailed Description of Preferred Embodiments which may be read in light of the following figures.

BRIEF DESCRIPTION OF THE DRAWINGS

FIG. 1 is a timing diagram of one embodiment of the invention wherein a three-phase stepping motor is driven through three steps to provide an eight lines per inch format according to the present invention;

DETAILED DESCRIPTION OF THE PREFERRED EMBODIMENTS

The present invention is a method and apparatus for driving a stepping motor in an improved manner. There are three broad, general classes of stepping motors currently in use, namely a permanent magnet-type, variable reluctance-type and hybrid-type stepping motor. The typical motor contains a stator which has a number of wound poles. The rotor is usually cylindrical and toothed. A stepping motor operates by means of the interactions between the rotor magnetic biasing flux and the magnetomotive forces generated by applied currents in the stator windings. If the pattern of winding energization is fixed, there is a series of stable equilibrium points generated around the motor. The rotor will move to the nearest of these and remain there. If then the windings are excited in sequence, the rotor will follow the changing point of equilibrium and rotate in response to the changing pattern. As with all stepping motors there is a detent torque developed in the motor about each point of equilibrium. The restoring torque is generated on the rotor whenever the rotor is moved from the position which has minimum reluctance for the magnetic flux.

A variable reluctance motor has a stator which has a number of wound poles. The rotor consists of a cylindrical, toothed member whose teeth or poles have a relationship to the stator poles and their teeth, if any, determined by the step angle required. When a current is passed through the proper windings, torque is developed in such a way as to turn the rotor to a position of minimum magnetic path reluctance. This position is statically stable in that external torque is require to move the rotor from this position. Many such stable points are configured in the typical variable reluctance motor. By proper selection of an energization sequence, these stable positions can be made to rotate around the stator poles giving rise to a angular speed of the rotor. When the energization sequence is fixed, the rotor position becomes fixed. Thus, the shaft position is stepped by changing the pattern of winding energization.

Throughout the description of the preferred embodiment it is assumed that a variable reluctance motor is the object of description. However, it must be understood that all stepping motors known to the art are to be included within the spirit and scope of the present invention. A three-phase variable reluctance motor is shown and described herein only for the purpose of illustrating in a concrete example one embodiment of the present invention. In particular, the stepping motor in the present invention is used in conjunction with a digital printer, although it is to be understood that the present invention may be used in any application wherein a stepping motor might be advantageously used.

Figure 2A:
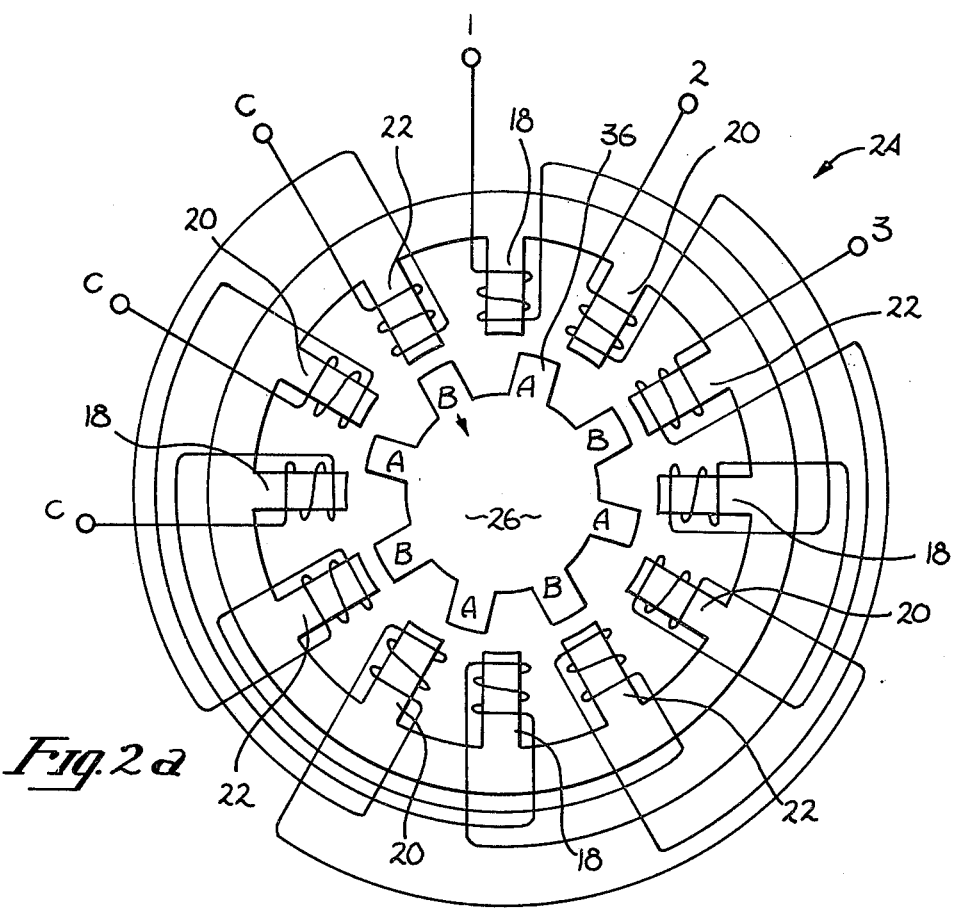
FIGS. 2a through 2f diagrammatically show the relative configurations of a rotor and stator in a three-phase, variable reluctance stepping motor driven in the sequence illustrated in FIG. 1.
Figure 2B:
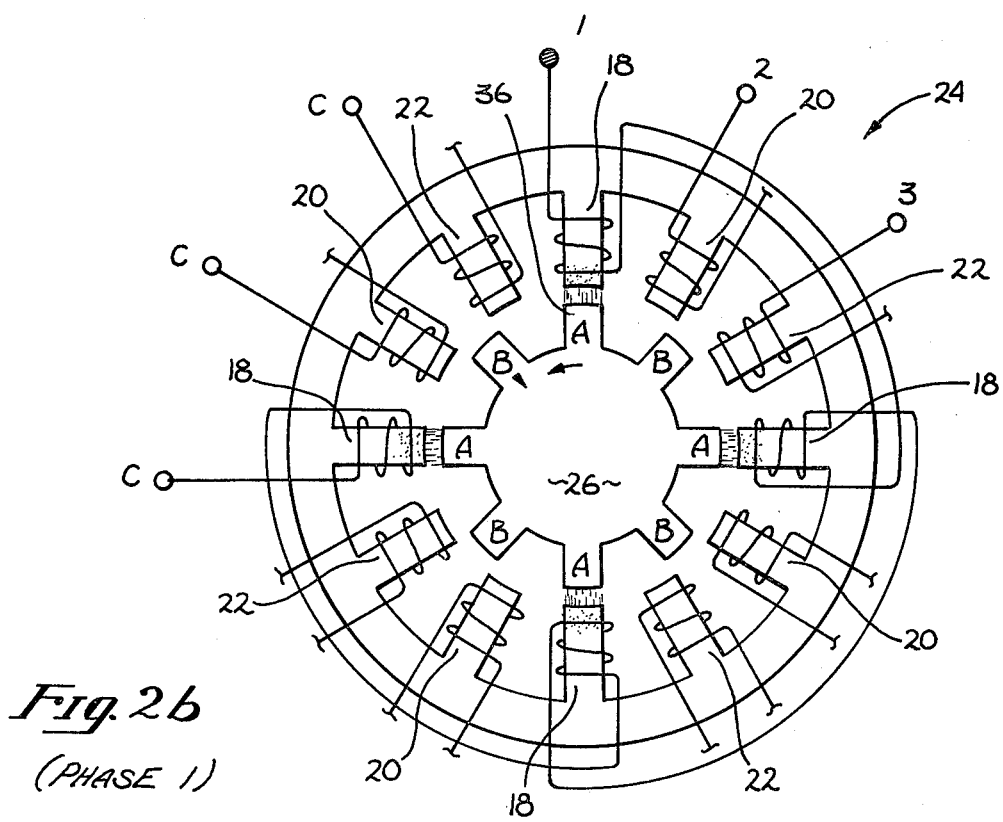
Figure 2C:
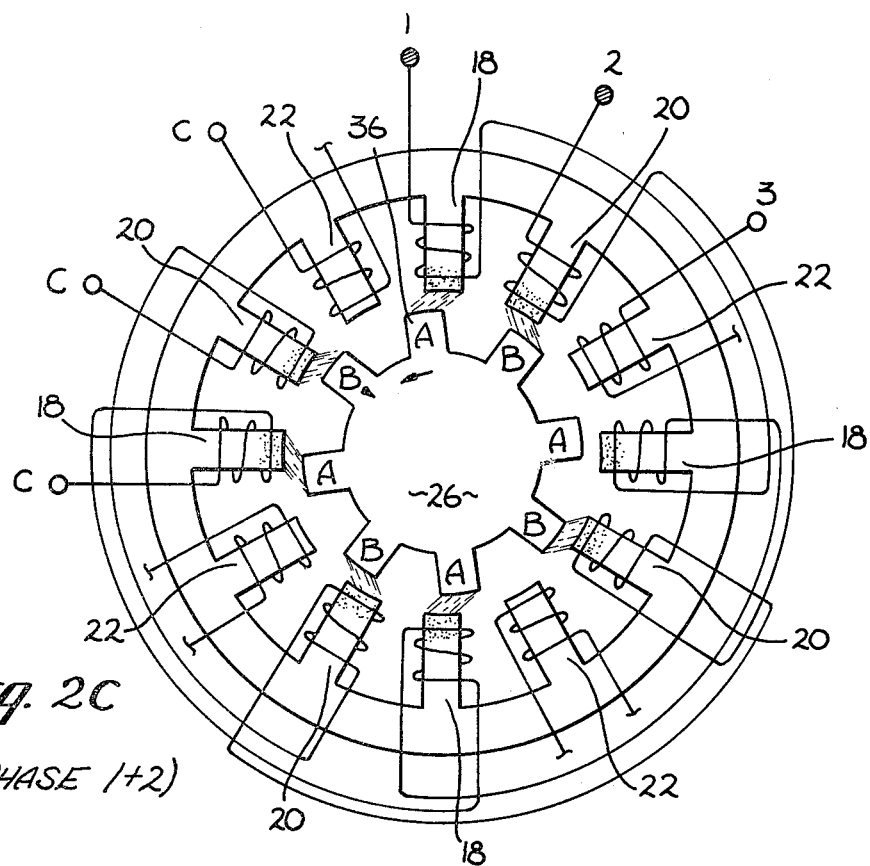

FIG. 1 illustrates a timing diagram which shows one embodiment of the present invention wherein a three-phase, variable reluctance stepping motor of the type illustrated in FIGS. 2a through 2f is driven. In the application where the stepping motor is used in a digital impact printer, the relationship of the phased drive of the stator coils of a variable reluctance, three-phase stepping motor is shown with respect to the hammer trigger signal illustrated diagrammatically on line 10 of FIG. 1. Lines 12, 14 and 16 represent respectively the voltage applied to phases one, two and three of the stator coils. As illustratively shown in FIGS. 2a through 2f there are twelve stator coils which are ordered into three phases, and sequentially arranged around the stator assembly 24. Thus, if each of the stator coils were likened to the hour marks on a standard clock, phase one coils 18 would be located at 12, 3, 6 and 9 o'clock, phase two coils 20 would be located at 1, 4, 7 and 10 o'clock, while phase three coils 22 are located at 2, 5, 8 and 11 o'clock. On the other hand, rotor 26 is provided with eight symetrically arranged rotor poles. When any one of the phases is energized, rotor 26 will align itself in an equilibrium position of minimum reluctance. For example, in FIG. 2a 26 is shown as aligned in an equilibrium position which would be created in stator assembly 24 when phase three stator coils 22 only are energized.

The methodology of the present invention as illustrated in FIG. 1 may now be understood and graphically compared to the sequence of rotor and stator configurations shown in FIGS. 2a through 2f. The voltage and current scales are arbitrary and the time scales shown in FIG. 1 are purely for the purposes of characterization and many other values may be chosen according to the design principles disclosed herein. The timing diagram of FIG. 1 illustrates a driving sequence which will move rotor 26 through three steps of the stepping motor to generate an eight lines per inch advance as determined in part by the details of the mechanical linkage between the stepping motor and the paper feed mechanism of the digital printer.

As hammer signal 10 is activated a clamp signal 28 is permitted to go low thereby releasing the roller, platen, or other feed device in the digital printer. Approximately 9 milliseconds after the activation of the hammer signal and after the hammer impact, a first or low level voltage will be applied to phase one stator coils 18 as shown in FIG. 1 as signal 12. In the illustrated embodiment a leading low level portion 30 of signal 12 is set at 9 volts. Approximately 1.96 milliseconds after the initiation of low level portion 30, a high level pulse or portion of signal 12 is generated at approximately 37 volts. Again, the magnitude of voltage is shown only for the purposes of discussion. After approximately 1.2 milliseconds, signal 12 is reduced to a following low level portion 34 of signal 12. Phase one stator coils 18 are de-energized after approximately an additional 2.9 milliseconds when signal 12 returns to ground.

Similarly, phase two signal 14 energizes phase two stator coils 20 by use of a leading low level signal 30, a high level signal 32 and a following low level signal 34 according to the time durations illustrated in FIG. 1. Phase three signal 16, which energizes phase three stator coils 22 has a similar waveshape with the exception that following low level portion 34 is indefinitely extended in time to a predetermined point in the next cycle.

It is important to note the overlapping relationship between each of the phases one, two and three with respect to each other in combination with the high level energization as shown by high level portion 32 of each signal. The importance of this overlap in the present invention as shown in FIG. 1 can now be graphically understood in light of FIGS. 2a through 2f. FIG. 2a represents a starting position wherein phase three stator coils 22 are energized. Rotor 26 is maintained in a fixed position as shown in FIG. 2a. Assume then that the timing cycle as shown in FIG. 1 is initiated. The hammer trigger is activated and the hammers imprint a line of type upon the hard copy print-out. The clamp signal is deactivated and the roller or print feed mechanism is released. Nine milliseconds after the hammer trigger, signal 12 is activated by the generation of leading low level portion 30 while following low level portion 34 of signal 16 on phase three stator coils 22 remains active. As a result of phases 1 and 3 being simultaneously activated, a quasi-equilibrium position is generated within stator assembly 34. Consider rotor pole 36 as a fixed point of reference. In the diagram illustrated in FIG. 2a rotor pole 36 is positioned 15° between the adjacent phase one and phase two stator coils 18 and 20 respectively. When coils 18 and 22 are energized the new equilibrium position is such that stator pole 36 moves to 7.5° from phase one stator coil 18 thereby causing rotor 26 to move in a counter-clockwise direction.

It should further be noted that the equilibrium positions, which are located every 15° about stator assembly 24 in the type of stepping motor illustrated in FIG. 2 are deeper or more statically stable points of equilibrium that the quasi-equilibrium positions which are created halfway between two adjacent equilibrium positions. Therefore, the quasi-equilibrium positions are "softer" positions having less of a detent motion and generally provides smoother and more gentle angular acceleration and deceleration to rotor 26 of the stepping motor than would the creation of an equilibrium configuration.

As high level portion 32 of signal 12 is generated signal 16 is deactivated. Rotor 26 then tends to rotate to the equilibrium position illustrated in FIG. 2b with a strong impulse force wherein phase one stator coils 18 only are energized. After an appropriate time period (1.2 milliseconds), signal 12 is returned to a following low level portion 34. At the appropriate time as shown in FIG. 1, low level portion 30 of signal 14 is simultaneously activated while low level portion 34 of signal 12 remains active. At this time phase one stator coils 18 and phase two stator coils 20 are simultaneously energized to create a second quasi-equilibrium position which tends to rotate rotor 26 into the configuration illustrated diagrammatically in FIG. 2c. The timing is such that this quasi-equilibrium configuration is maintained for a fraction of the duration of the configuration when the actual position of rotor 26 has rotated past the quasi-equilibrium position. This tends to decelerate rotor 26.

Figure 2D:
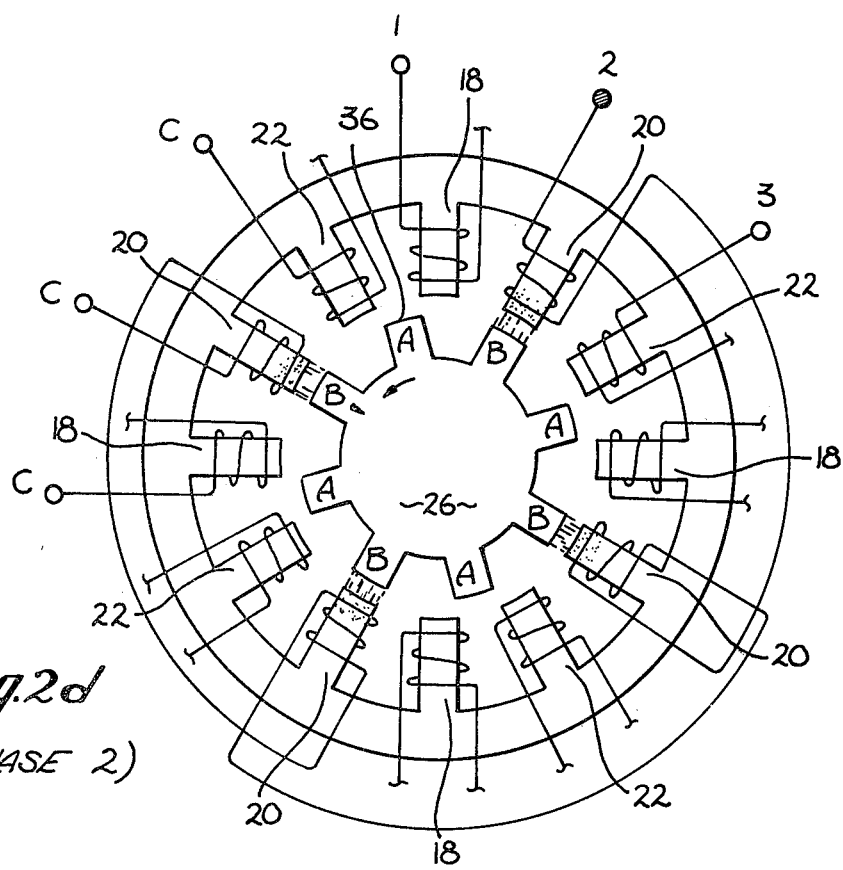
Figure 2E:
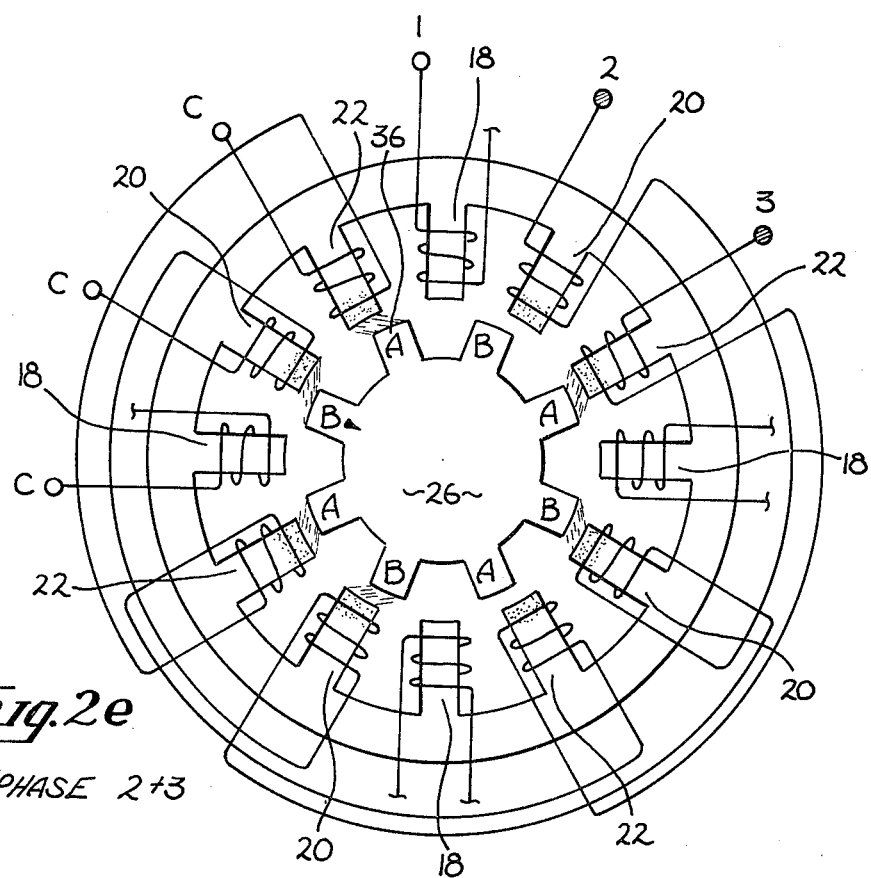
Figure 2F:
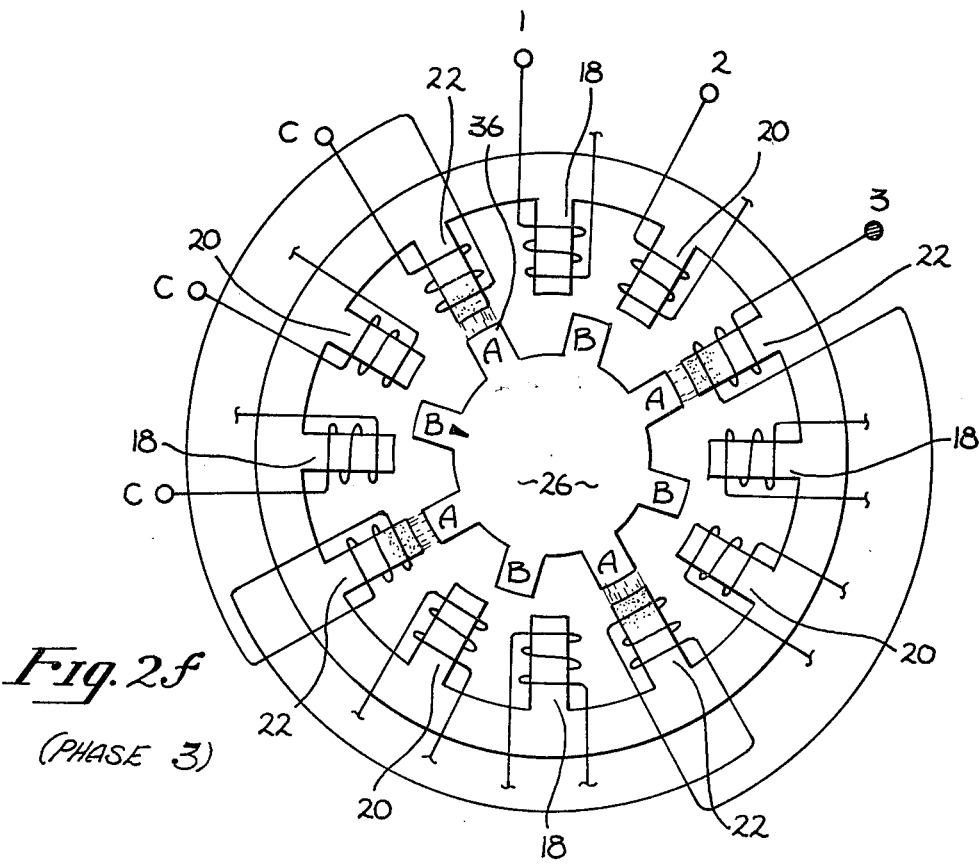

Signal 12 is then activated while signal 14 is pulsed with a high level portion 32 which tends to rotate stator coil 26 into the configuration shown in FIG. 2d. After an appropriate interval (0.5 milliseconds), signal 14 is returned to a following low level portion 34. At the appropriate time as shown in FIG. 1, signal 16 is activated to a leading low level portion 30 while following low level portion 34 of signal 14 remains active. This creates a third equilibrium position which tends to rotate rotor 26 into the configuration shown in FIG. 2e. However, the timing and momentum of rotor 26 is such that rotor 26 has actually rotated past the quasi-equilibrium position shown in FIG. 2e for at least part of the duration of this quasi-equilibrium configuration, and has approached the equilibrium position as illustrated in FIG. 2f. As a result, the quasi-equilibrium configuration formed by the simultaneous activation of phase two stator coils 20 and phase three stator coils 22, tends to brake or angularly decelerate rotor 26. Since the quasi-equilibrium position is a softer equilibrium position, the braking supplied tends to be less impulsive than normally found in stepping motors. Finally, signal 14 is deactivated and high level portion 32 of signal 16 is generated followed by a long and indefinite following low level portion 34 which tends to lock rotor 26 into the equilibrium configuration illustrated in FIG. 2f and to maintain the rotor in that position. Approximately 6.77 milliseconds after high level portion 32 of signal 16, clamp signal 28 is reactivated to secure the roller or paper feed mechanism until the next paper feed cycle. Thus, it can be seen by comprising FIGS. 2a and 2f that rotor 26 has been rotated through 45° or three steps of the stepping motor illustrated in FIGS. 2a through 2f.

Figure 3:
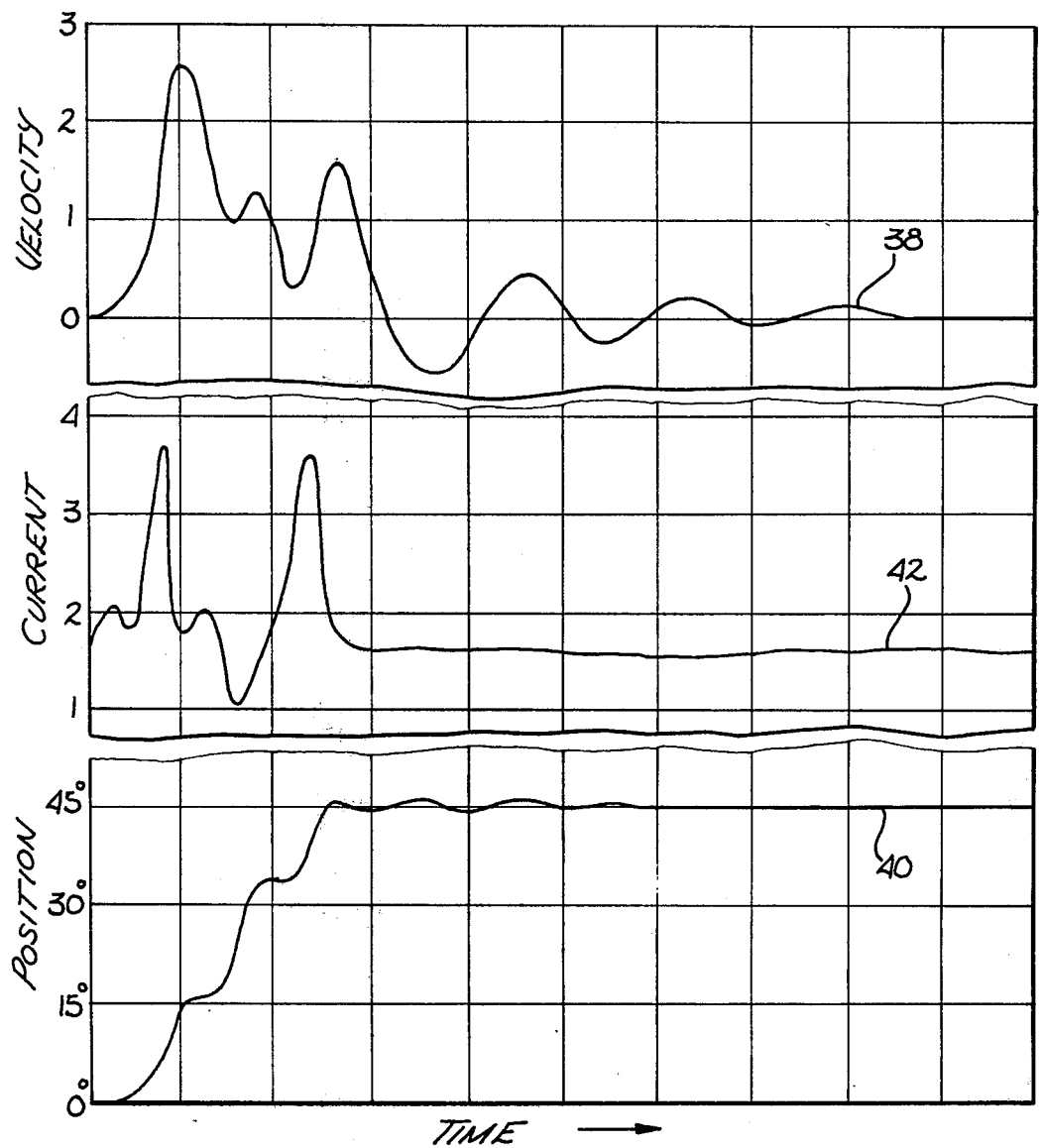
FIG. 3 is multiple oscilloscope trace of the angular velocity, position and current of a motor driven as shown in FIGS. 1 and 2.

The actual performance of a three-phased stepping motor driven according to the timing diagram in FIG. 1 and as graphically shown in FIGS. 2a through 2f is experimentally illustrated in FIG. 3 as simplified comparative oscilloscope traces. Line 38 is a graph of the stepping motor's angular velocity as a function of time. Similarly, line 40 represents the stepping motor's angular displacement against the same time scale as line 38 while line 42 represents the total current consumption by stator assembly 24. The principle advantages of the present invention are graphically shown in FIG. 3. The angular velocity of the stepping motor rises to a first maximum when the first 15° or step of angular displacement is executed. The velocity is reduced and then rises to a second maximum coincidentally with the second angular step. Finally, velocity is again reduced before the third angular step is completed. Thus, the velocity at the third step is less than the velocity at the first step.

Therefore, as rotor 26 reaches the configuration illustrated in FIG. 2f the velocity of rotor 26 drops quickly to zero with very little ringing either in the displacement or velocity of the stepping motor. As compared with the operation of a standard stepping motor, not employing the methodology of the present invention, the angular velocity of the stepping motor approaches each of the equilibrium positions with much greater slope and ringing. Moreover, no additional cycles need be generated in the present invention in order to bring rotor 26 to a complete stop at the end of the cycle or to prevent or decrease hard ringing at the final position.

Figure 4:
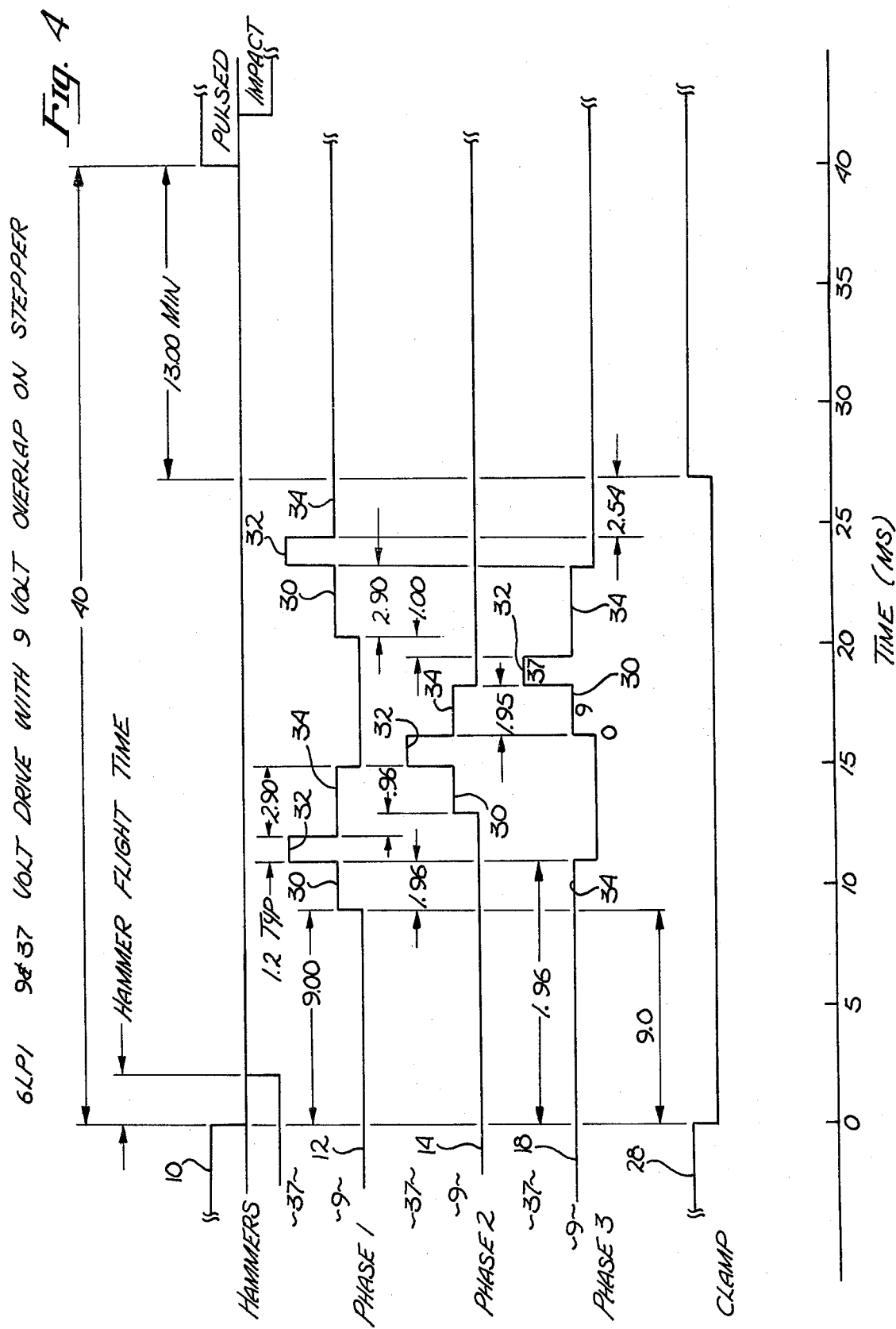
FIG. 4 is a timing diagram of the same embodiment illustrated in FIG. 1 wherein the same three-phase stepping motor is driven in a second manner to provide a format resulting in six lines per inch of print.

FIG. 4 illustrates another embodiment of the present invention wherein the stepping motor of FIGS. 2a through 2f would be cycled through four steps with the timing as shown in FIG. 4 and with the net result that a lower feed rate is achieved by the stepping motor when used in a digital printer. The embodiment of FIG. 4 represents a six lines per inch feed. The time intervals of the wave diagrams are approximately selected as illustrated such that the four steps of the cycle shown in FIG. 4 are completed in approximately the same amount of time as the three steps of FIG. 1. The execution of the first three steps of the stepping motor by energizing stator coils 18, 20 and 22 for phases one, two and three respectively, are substantially the same as shown in FIG. 1 with the addition that signal 12 relating to phase one stator coils 18 is reactivated during the following low level portion 34 of signal 18 to create an additional quasi-equilibrium position followed by the creation of an equilibrium position by the generation of a high level portion 32 of the second pulse of signal 12 to further rotate rotor 26 to alignment with phase one stator coils 18, or in other words, an additional step. It is to be noted then that following low level portion 34 of the second pulse of signal 12 is maintained for an indefinite duration at the low level voltage until the start of the next cycle in which case signal 14 will be the first activated signal and will be characterized by a double pulse. Thus, the respective roles of signals 12, 14 and 18 will be consecutively rotated as the four steps are executed in the timing scheme shown in FIG. 4.

Figure 5:
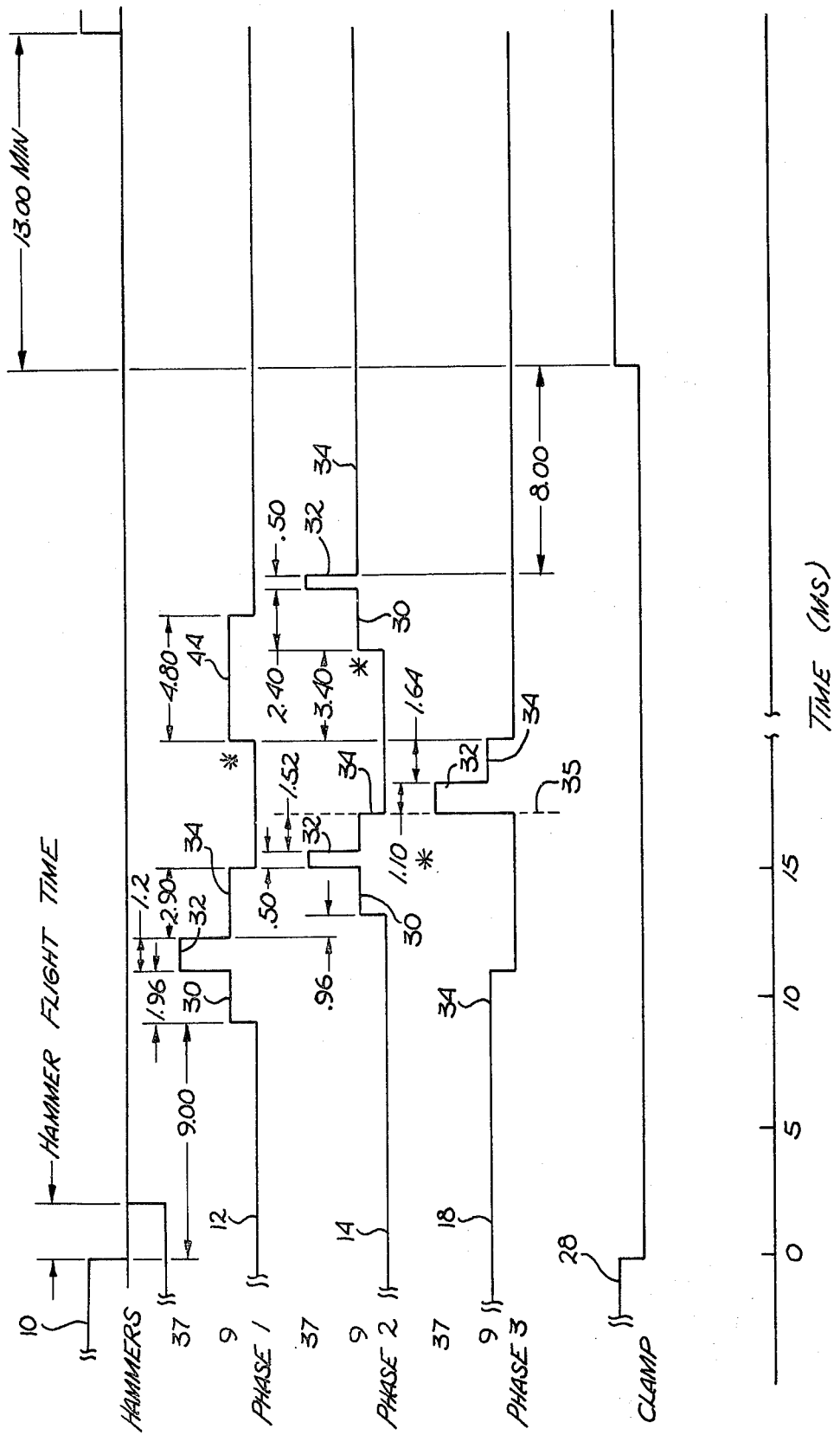
FIG. 5 is a timing diagram showing five or more steps which may be used to slew the paper through the printer.

FIG. 5 is a timing diagram which illustrates a slew cycle rate which consists of five or more steps of the stepping motor. The general operation of the stepping motor is similar to that shown and discussed in regard to FIGS. 1 and 4 with the exceptions illustrated in FIG. 5. Signal 18 has no low level leading portion 30 but is initiated with a high level portion 32. Following the low level portion 34 of signal 18, a low level signal 44 is generated as part of signal 12 in a non-overlapping relationship. After an appropriate delay, a leading low level portion 30 of signal 14 is activated followed by a high level portion 32 and following low level portion 34 of signal 14. In the embodiment illustrated in FIG. 5 a general analysis of the sort shown in FIGS. 2a through 2f will show that the stepping motor rotates through 75° or five steps. If more than five steps is desired the starred pulse in signal 18 is repeated beginning at point 35 in the pulse train to provide an arbitrary number of additional steps to slew the paper through the feed mechanism. Beginning at the falling edge of following low level portion 34 of the first pulse of signal 14 and following in sequence the activation and deactivation of signals 18, 12 and then 14, three additional steps will be executed for a minimum of five steps. Repetition of the pulse shown as signal 18 will allow the stepping motor to be slewed through a arbitrary total number of steps.

Figure 6:
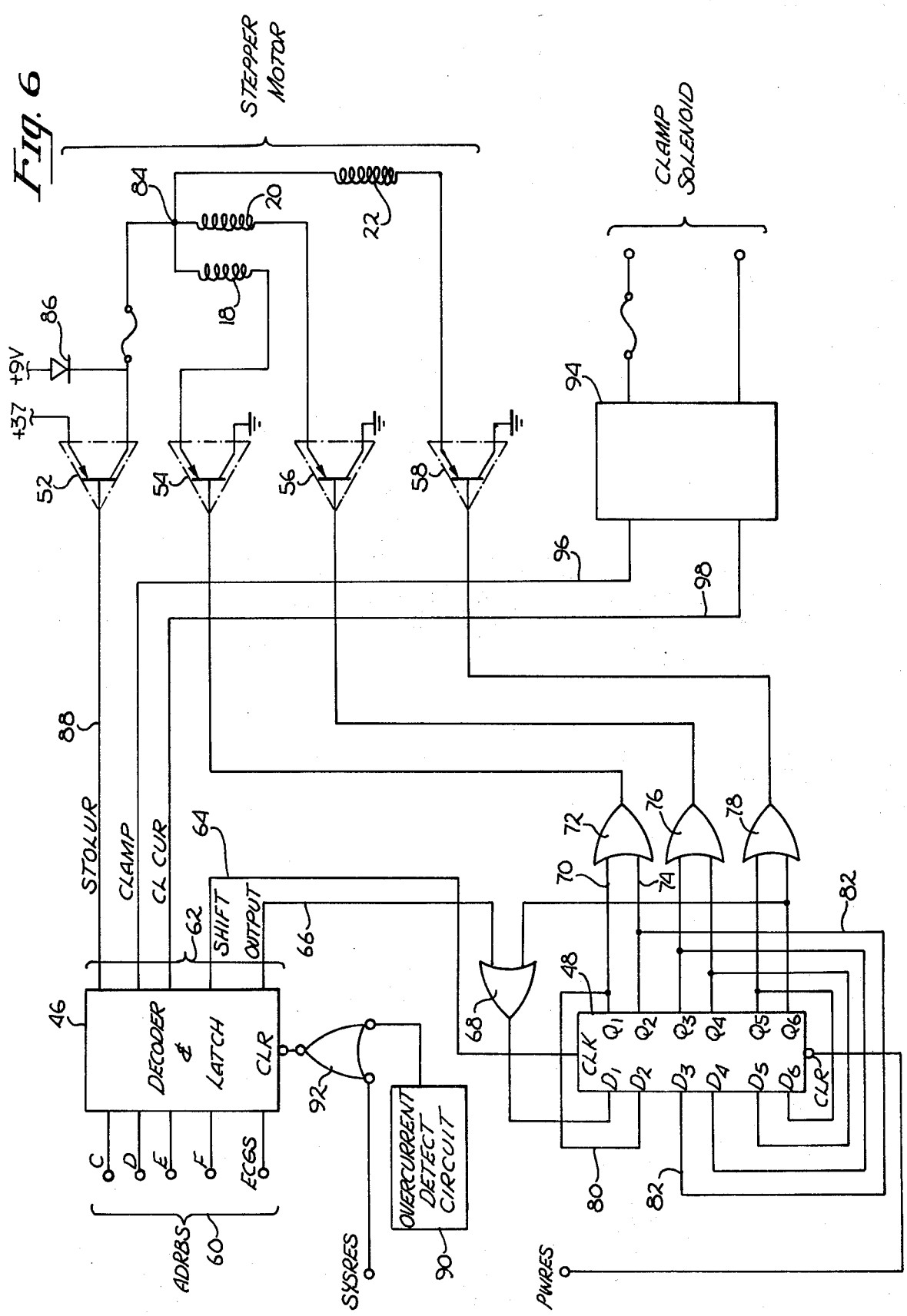
FIG. 6 is a simplified, diagrammatic schematic showing one embodiment of the apparatus of the present invention.

The apparatus of the present invention, which is designed to generate the timing diagrams illustrated in FIGS. 1, 4 and 5, is shown in simplified and schematic form in FIG. 6. The apparatus is comprised of a decoder 46, a multiple D-type shift register 48, and amplifiers 52 through 58. In the illustrated embodiment decoder 46 has five binary inputs 60 which include four binary data bits and a latch enable signal, ECGS. The binary data address and latch enable signal are generated in a central processor unit of the type shown in the co-pending application entitled "Microprogrammable Processor Controlled Printer System" filed June 10, 1977, Ser. No. 805,527, assigned to the same assignee of the present invention. The binary data is appropriately latched into decoder 46 and decoded into an appropriate output on the five output lines 62.

Consider output lines 64 and 66. Line 64 is coupled between one of the outputs 62 of decoder 46 and the clock input of shift register 48. Line 66 is coupled between another one of the outputs 62 of decoder 46 and OR gate 68. The output of OR gate 68 is coupled to the D input corresponding to the first bit of shift register 48. In the illustrated embodiment shift register 48 is a six bit shift register having its outputs ordered in a consecutive manner and paired, namely paired into groups Q1 and Q2, Q3 and Q4, and Q5 and Q6. Output Q1 of register 48 is coupled to line 70 which in turn is one of the inputs to an OR gate 72. Output Q2 of register 48 is coupled to line 74 which is coupled to the other input of OR gate 72. Similarly, Q3 and Q4 are coupled to OR gate 76 while Q5 and Q6 are coupled to the inputs of OR gate 78. The Q output corresponding to each bit of shift register 48 is coupled to the next highest ordered input. In other words, Q1 is coupled by means of line 80 to the input D2. Similarly, Q2 is coupled through line 82 to input D3. In this manner each of the Q outputs, with the exception of Q6, is coupled to the next higher ordered D input.

The output of OR gate 72 is coupled to the input of amplifier 54 and in the same manner the outputs of OR gates 76 and 78 are coupled to the inputs of amplifiers 56 and 58 respectively. Amplifiers 52 through 58 act in effect as switching circuits which may be designed according to well known principles to provide a conductive path between the remaining two ports in response to the signal provided at the input. For the purposes of simplicity, circuits 52 through 58 have been shown diagrammatically as standard transistors although in practice, many additional elements to include circuit compensation and protection may be included.

One port of amplifiers 54, 56 and 58 is coupled to one terminal of phased stator coils 18, 20 and 22 respectively. For the purposes of illustration and simplicity, stator coils 18, 20 and 22 have been shown as a single coil although it must be understood that the illustrated coil represents the entire portion of stator assembly 24 associated with the given phase. The other port of amplifiers 54, 56 and 58 is coupled to ground. Thus, upon activation of the input signal to any one of amplifiers 54, 56 and 58 a conductive path is provided to ground for the corresponding stator coil. The other terminal of each of the stator coils 18, 20 and 22 are commonly connected to a center tap 84. Center tap 84 is in turn coupled to a diode or its circuit equivalent 86 which normally provides a 9 volt signal to central tap 84. Amplifier 52 is coupled to a 37 volt supply which may be selectively coupled through amplifier 52 to center tap 84 in response to the control signal coupled to the input of amplifier 52. Therefore, according to which of the amplifiers 54, 56 and 58 is active in response to its input signal, one of the stator coils 18, 20 and 22 is coupled to ground across a 9 volt supply, except in those circumstances in which amplifier 52 is active in which case 37 volts is applied across the selected stator coils. Therefore, by selectively generating the input signals to amplifiers 52, 54, 56 and 58 the waveform trains of FIGS. 1, 4 and 5 can be generated.

Consider for example the operation of shift register 48. Initially, shift register 48 is reset by activation of the power reset signal, PWRES, through the clear input of shift register 48. Shift register 48 is initialized according to a power initialization sequence fed into decoder 46 from a central processor. In other words, an output and shift signal are generated on line 66 and 64 respectively at the beginning of the sequence such that the output Q1 and Q2 of shift register 48 are set at a binary 1. In that case, OR gate 72 has a true output thereby allowing stator coil 18 to be energized at a low level signal.

Then the shift signal is selectively activated on line 64 while the output signal on line 66 is set at a binary zero. Thus, the output Q1 will be set at a binary zero while Q2 and Q3 will be set at binary ones and all remaining Q outputs at binary zeroes. In such an instance the output of OR gates 72 and 76 will both be true thereby allowing the simultaneous activation of stator coils 18 and 20 at the low level or 9 volt signal. A second shift signal on line 64 with the binary zero set on line 66 will set the Q1 and Q2 outputs to binary zero and the Q3 and Q4 binary outputs to binary ones. Therefore, the output of OR gate 72 will be false while the output of OR gate 76 will be true. Thus, stator coil 20 alone will be energized. Independently, amplifier 52 may be activated by the generation of a stepping current, STPCUR, on line 88 from decoder 46. Whenever line 88 goes active center tap 84 will be connected to a 37 volt supply. Therefore, the proper synchronization of STPCUR with the shift and output signals on lines 64 and 66 respectively, will produce the two level signals shown in FIGS. 1, 4 and 5.

It should be noted in particular with respect to FIG. 5 that pulse of signal 18 on phase three coil 22 is shown in a non-overlapping relationship with the pulses set on signals 14 and 12 applied to stator coils 20 and 18 respectively. In actuality, an overlapping signal is in fact generated according to the circuitry shown in FIG. 6. However, the duration of overlap is microseconds in magnitude and if drawn in FIG. 5 would be shown as extremely narrow spike. The duration of such overlaps as controlled by the inputs fed into decoder 46 from the central processor described in the related application entitled "Microprogrammable Processor Controlled Printer System" filed on June 10, 1977, Ser. No. 805,527, is so much less than the mechanical time constants characteristic of the stepping motor as to have no effect upon its operation.

Various other additional circuits may be included with the circuitry illustrated in FIG. 5, for example, decoder 46 may have a means for being cleared which would include an over-current detection circuit 90 designed according to principles well known in the art to detect an over-current condition in the stepping motor which would clear and thereby disenable decoder 46 and deactivate the stepping motor. The output of circuit 90 could be included in a logic gate 92 with normal system reset signals, SYSRES, used to reinitialize the status of the circuitry. Similarly, some of outputs 62 from decoder 46 could be devoted to controlling and activating a clamp solenoid circuit 94 which would control and power and the clamp solenoid or locking mechanism in the paper feed. In the embodiment illustrated, clamp solenoid circuit 94 is a constant current switching circuit having two inputs, 96 and 98, to provide the desired, timed clamping signals to a locking solenoid in the paper feed mechanism of the digital printer.

Clearly, the proper coordination of timing signals to the input of amplifiers 52, 54, 56 and 58 are dependent upon the properly timed and coded inputs 60 to decoder 46. These inputs do not arise in the circuitry of FIG. 6 but are generated in a central processor according to a program, which central processor is described in greater detail in the above referenced co-pending application.

Figure 7A:
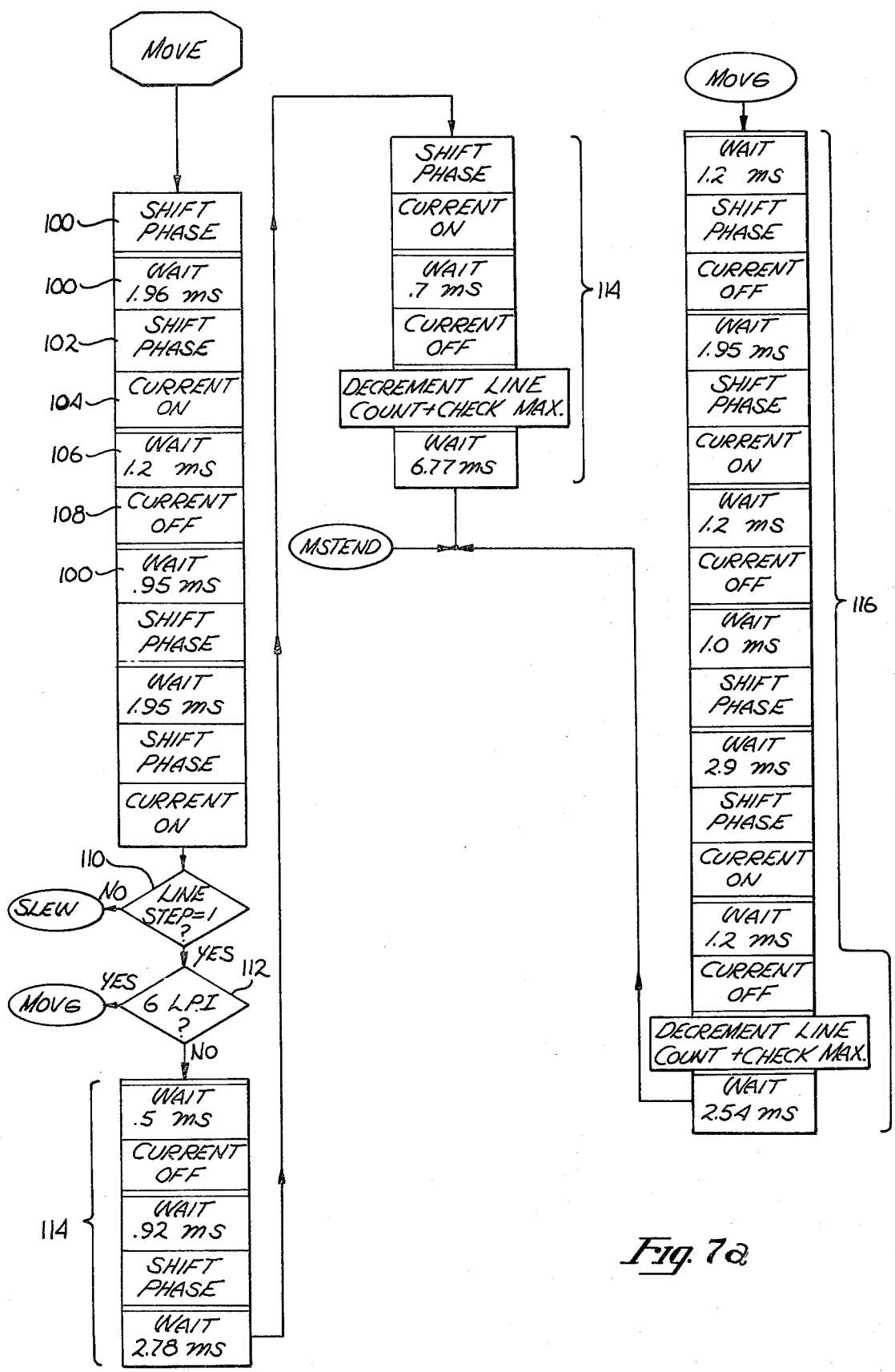
FIGS. 7a and 7b illustrate a flow diagram showing one program by which the timing diagrams of FIGS. 1, 4 and 5 may be implemented.
Figure 7B:
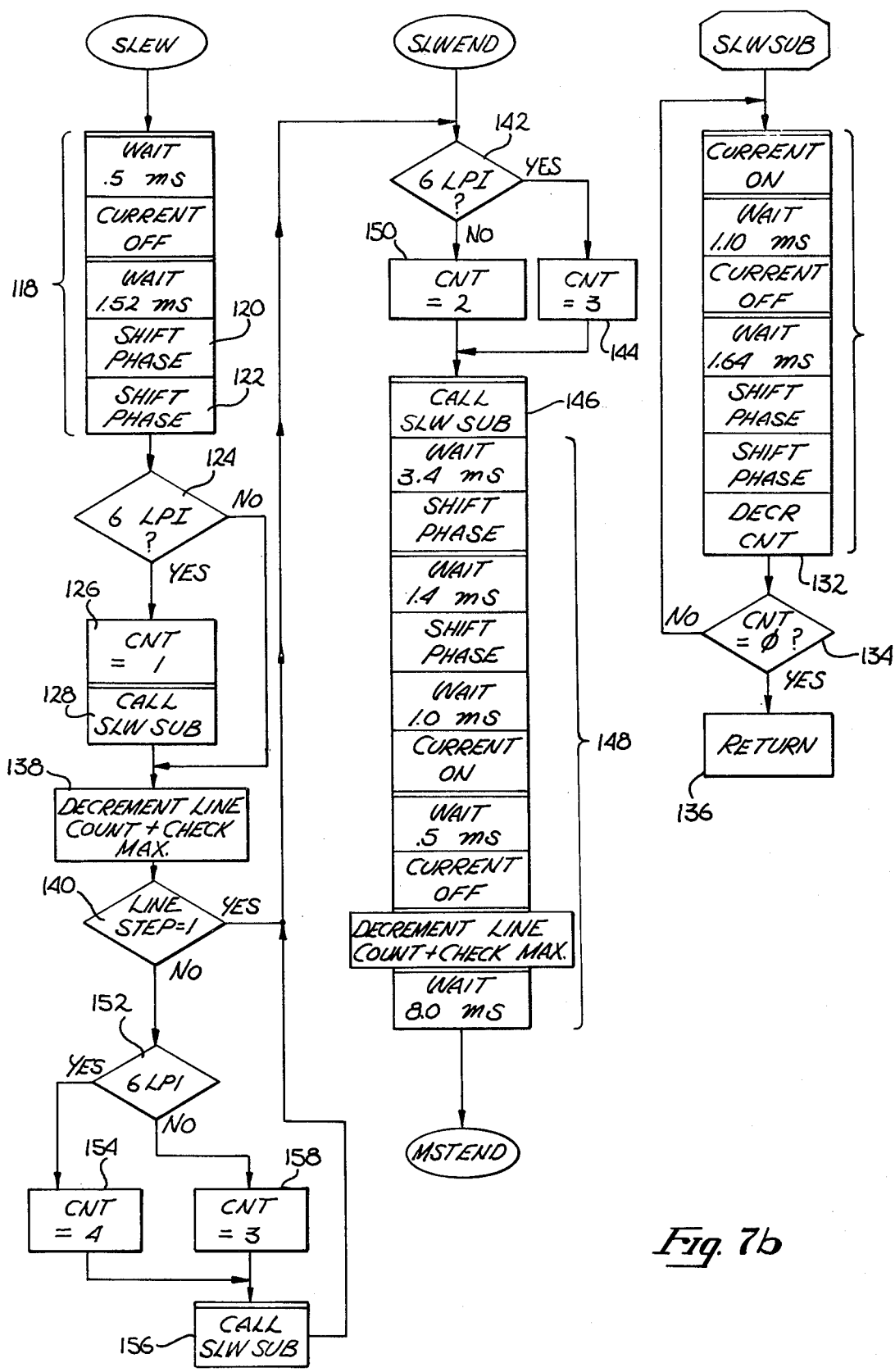

One program by which the wave diagrams of FIGS. 1, 4 and 5 may be generated is illustrated in simplified form in FIGS. 7a and 7b. FIG. 7a illustrates the beginning of the sequence denoted as the MOVE subroutine of the overall program for the digital printer. The flow diagram may be understood in light of the timing diagrams illustrated in FIGS. 1, 4 and 5. During step 100, "shift phase," inputs 60 to decoder 46 are changed to the next ordered code word in a series of code words stored within the central processor and its memory. After delay of 1.96 milliseconds the next code word is generated which includes the proper code to generate the high level current signal, STPCUR on line 88 in step 102. The high level signals maintained in step 104 for approximately 1.2 milliseconds and then turned off at step 106. The program then delays for 0.95 milliseconds in step 108 followed by another phase shift step 100. This sequence is repeated until the high voltage level signal is activated for signal 14 as illustrated in each of the timing diagrams of FIGS. 1, 4 and 5. In other words, a timing of the eight and six lines per inch feed and slew is identical through high level signal 32 of signal 14. In step 110 the manually set inputs to the digital printer are examined to determine whether or not single spacing has been called for. If not, then double spacing or a greater paper advance is required and the central processor will move to the slew sequence as illustrated in FIG. 7b. If a single line step or spacing is indicated, then the central processor will examine whether a six line per inch feed is called for at step 112. If so, the processor will then branch to the MOV6 portion of the sequence as illustrated in FIG. 7a. If not, an eight line per inch feed is required and the remaining waveforms as illustrated in FIG. 1 are generated in the series of steps denoted by the referenced character 114.

If the advancing rate is six lines per inch as determined at step 112, the program moves to subsequence, MOV6, which includes each of the steps collectively denoted by the referenced character 116. A comparison of these steps with the timing diagram of FIG. 4 will verify that steps 116 do in fact result in the waveform diagram of FIG. 4. If, however, at step 110 the line step is not equal to 1 then a slewing motion is indicated and the program will branch to the slew sequence.

The slew sequence is shown in FIG. 7b and is illustrated diagrammatically in the timing diagram of FIG. 5. Beginning with the rising edge of the high level signal in phase two, signal 14, the first five steps of the sequence are executed and collectively denoted by reference numeral 118. It is to be noted that the last two steps 120 and 122 of steps 118, form the transition between the following low level portion 34 of the first pulse of signal 14 and the high level portion 32 of signal 18 in FIG. 5. What is actually created is a low level voltage spike as a leading low level portion of signal 18 equivalent in length to the duration of one machine cycle. Inasmuch as the machine cycle is orders of magnitude faster than any of the time constants employed by the stepping motor, such a spike is not practically illustrated in FIG. 5.

At step 124, it is determined whether or not the machine is slewing in the six lines per inch mode or the eight lines per inch mode. If the machine is slewing in the six lines per inch mode, a count is set within the central processor at step 126 to unity and the slewing subroutine is called up at step 128. The slewing subroutine, SLWSUB, is shown in FIG. 7b as collectively denoted by reference character 130. The steps included as part of the group of steps 130 can be easily verified as generating high level signal 32 and following low level signal 34 of signal 18 on phase three and the rising edge of signal or pulse 44 or signal 12. The count is decremented at step 132 and examined at step 134 to determine whether or not it has reached zero, if not, a pulse shape of the type shown on signal 18 of FIG. 5 is replicated on each of the ordered phases in turn until the count reaches zero. When the count reaches zero at step 134, the slew subroutine is exited at step 136. The line step count is then decremented at step 138 and then examined at step 140.

If at step 140 single spacing is indicated the central processor will be diverted to step 142. If as we have assumed, the printer is set in the six lines per inch mode, count will be set equal to 3 at step 144 and the slew subroutine entered at step 146. As described above, the slew subroutine will then generate three additional pulses on three consecutive phases. Thereafter, the steps collectively denoted as 148 will produce two final pulses for the stepping motor of the waveshape illustrated in FIG. 5 on signals 12 and 14. Thus, in the illustrated embodiment, when the machine is set in the slew mode in the six lines per inch mode, with single spacing, eight pulses will be generated and applied to the three phases of the stepping motor. Since the six lines per inch waveform as illustrated in FIG. 4 requires four pulses to advance a single line, a single space will have been created by the slew.

Similarly, if at step 124, the central processor is in the eight lines per inch mode the central processor will immediately move to step 138 to decrement the line count for overall form control and then to step 140 to examine whether it is in the single- or double-spacing configuration. If again, in the single-spacing configuration, control is transferred to to step 142 wherein it will be determined that the machine is in the eight lines per inch mode and the count set to 2 at step 150. The slew subroutine is again called up at step 146 to execute two consecutively ordered steps within the three phases of the stepping motor. After which the two final pulses as shown in FIG. 5 are generated by steps 148. Thus, six steps will have been generated in total, step 126 having been avoided at step 124, to generate a single space slew in an eight line per inch configuration.

However, if the central processor is set in a doublespaced mode, step 140 will be exited and step 152 entered to redetermine whether or not the machine is in six or in eight lines per inch mode. If in the six lines per inch mode, the count is set to 4 at step 154 and the slew subroutine called up at step 156. Four additional pulses are generated after which the program is returned to step 142 and an additional three pulses generated at step 146. The final two pulses are generated during steps 148 for a total of 12 steps which result in a double-spaced slew in the six lines per inch mode. If in the eight lines per inch mode, the central processor exits step 152 to set the line count equal to three at step 158. In the same manner, three steps of the stepping motor are executed at step 156 after which steps 142 and 150 are entered. The final two steps of the slew sequence are executed in steps 148 for a total of nine steps or a double-spaced slew when in the eight lines per inch mode. An arbitrary number of lines thus be single- or double-spaced by appropriately setting the line count within the central processor, which according to a proper subroutine and return, will cause the slew sequence to be repeated in a single or double-spaced format until the desired number of lines slewed has been achieved.

Although the present invention has been described with respect to a particularly illustrated apparatus and methodology, it must be understood throughout that the particular application discussed, the time durations of the various pulses in their configuration have been specifically set forth only as a characterization of the present invention and are not intended to limit the scope of the claims. Many other embodiments may be devised by one with ordinary skill in the art without departing from the spirit and scope of the present invention.

I claim:

1. An improvement in a method for driving and stopping a stepping motor capable of executing repetitive angular steps on a motor shaft and having a plurality of stator and rotor poles, said stator poles being grouped into a multiple of phased sets, said phased sets of stator poles being sequentially individually activated so that the rotor poles assume a plurality of equilibrium configurations wherein each stator pole of the activated one of said phased sets of stator poles is aligned with a rotor pole, said improvement comprising the steps of:

repetitively simultaneously activating, alternately with said sequential individual activation, at least two of said multiple of phased sets of stator poles to create a plurality of quasi-equilibrium configurations with respect to the relative position of said stator poles and rotor poles wherein none of the stator poles are aligned with a rotor pole and wherein each quasi-equilibrium configuration is positionally distinguishable from each of said plurality of equilibrium configurations, whereby said motor runs in a smooth and uniform manner; and stopping said motor at a predetermined shaft position by initially activating said stator poles to step said shaft toward said predetermined shaft position, momentarily activating at least two of said phased sets of stator poles to retard the rotation of the shaft by urging the shaft in a reverse direction toward a quasi-equilibrium configuration, and finally again activating said stator poles to complete the step to said predetermined position, whereby said motor will stop in a smooth, nonoscillatory manner.

2. An improvement in a method for driving a stepping motor capable of executing repetitive angular steps on a motor shaft and having a plurality of stator and rotor poles, said stator poles being grouped into a multiple of phased sets and said rotor and stator poles assuming a plurality of equilibrium configurations with respect to the relative position of said stator poles and rotor poles, said improvement comprising the the step of:

simultaneously activating at least two of said multiple of phased sets of stator poles to create a quasi-equilibirium configuration with respect to the relative position of said stator poles and rotor poles wherein said quasi-equilibrium configuration is positionally distinguishable from each of said plurality of equilibrium configurations, whereby said rotor poles angularly accelerate and decelerate with respect to said stator poles in a smooth and uniform manner, said simultaneous activation being accomplished by selectively pulsing said stator poles with at least one two level signal having leading and following low level portions and a high level portion between said leading and following low level portions, said following low level portion of said two level signal on one of said two simultaneously activated sets of stator poles coinciding at least in part with said leading low level portion of said two level signal on said other one of said two simultaneously activated sets of stator poles, said high level portion of said two level signal on said one of said two simultaneously activated sets of stator poles following in time said following low level portion of said two level signal on said other one of said simultaneously activated sets of stator poles.

3. A method for driving a three phase stepping motor capable of executing repetitive angular steps on a motor shaft and having a plurality of rotor poles and stator poles, said rotor and stator poles assuming a plurality of equilibrium configurations with respect to the relative position of said stator and rotor poles, said method comprising the steps of:

energizing a first phase of said three phase stepping motor for a first time period;

energizing a second and adjacent phase of said three phase stepping motor for a second time period while keeping said first phase energized;

de-energizing said first phase while keeping said second phase energized for a third time period;

energizing a third phase of said three phase stepping motor for a fourth time period while keeping said second phase energized; and de-energizing said second phase while keeping said third phase energized for a fifth time period.

4. The method of claim 3 wherein said fifth time period is a quiescent period of indefinite duration.

5. A method for driving a three phase stepping motor capable of executing repetitive angular steps in a motor shaft and having a plurality of rotor poles and stator poles, said rotor and stator poles assuming a plurality of equilibrium configurations with respect to the relative position of said stator poles, said method comprising the steps of:

energizing a first phase of said three phase stepping motor for a first time period;

energizing a second and adjacent phase of said three phase stepping motor for a second time period while keeping said first phase energized;

de-energizing said first phase while keeping said second phase energized for a third time period;

de-energizing said second phase;

energizing said third phase for an fourth time period;

de-energizing said third phase;

energizing said first phase for a fifth time period;

energizing said second phase while keeping said first phase energized for a sixth time period; and de-energizing said first phase while keeping said second phase energized for an seventh time period.

6. The method of claim 5 wherein said eleventh time period is a quiescent period of indefinite duration.

7. An apparatus for driving a stepping motor having a plurality of stator and rotor poles, said stator and rotor poles being grouped into a plurality of phased sets and assuming a plurality of equilibrium configurations with respect to the relative position of said stator poles to said rotor poles, said apparatus comprising:

a decoder for decoding a digital command signal, and for selectively generating therefrom a clock signal, initialize signal and pulse signal;

means for selectively generating a plurality of timing signals derived from said clock signal and initialize signal, said means coupled to said decoder;

a plurality of amplifiers each having an input coupled to said means and an output coupled to one of said plurality of phased sets of stator poles, said amplifiers each being controlled by one of said plurality of timing signals to selectively simultaneously activate at least two of said plurality of phased sets of stator poles; and a center tap amplifier having an input coupled to said pulse signal from said decoder and an output coupled to a common center tap of said plurality of sets of said stator poles.

8. The apparatus of claim 7 further including a means for generating a solenoid clamping current in response to a clamp signal generated by said decoder and coupled to said means for generating a solenoid clamping current.

9. The apparatus of claim 7 wherein said center tap amplifier has at least two output levels, a low level, and a high level generated in response to said pulse signal.

10. The apparatus of claim 7 wherein said means for selectively generating a plurality of timing signals includes:

a multiple bit shift register having two bits for each said phased set of rotor and stator poles, said shift register having a clock input coupled to said clock signal, the inputs and outputs of said shift register being ordered and said outputs being consecutively paired, the output corresponding to each bit being coupled to the next higher order input;

a plurality of logic gates having inputs coupled to the outputs of said shift register, each one of said paired outputs of said shift register being coupled to the inputs of one of said plurality of logic gates, each said logic gate generating one of said plurality of timing signals; and an initialize logic gate having one input coupled to the highest order output of said shift register and another input coupled to said initialize signal from said decoder.

11. In a stepping motor capable of executing repetitive angular steps on a motor shaft and having a plurality of stator and rotor poles, said stator poles being grouped into multiple phased sets, said rotor and stator poles assuming a plurality of equilibrium configurations wherein each stator pole of one of said phased sets is aligned with a rotor pole, the improvement for smoothly stopping the motor at a predetermined shaft position corresponding to an equilibrium configuration, comprising:

initially activating said stator poles at the beginning of the final motor step to step said shaft toward said predetermined position;

momentarily activating at least two of said phased sets to retard the rotation of the shaft by urging the shaft in a reverse direction toward a position between two of said equilibrium configurations; and again activating said stator poles to complete the step to said predetermined position, whereby said motor will stop in a smooth, non-oscillatory manner.

* * * * *